United States Patent

[11] 3,584,208

[72] Inventors Richard S. Slawson
  Barrington, R.I.;
  Theodore C. Hamlin, Rehoboth, Mass.
[21] Appl. No. 6,452
[22] Filed Jan. 28, 1970
[45] Patented June 8, 1971
[73] Assignee George W. Dahl Company, Inc.
  Continuation-in-part of application Ser. No. 726,987, May 6, 1968, now abandoned.

[54] CONTROLLER
  4 Claims, 6 Drawing Figs.
[52] U.S. Cl. .................................................. 235/183,
  235/151.1, 318/18
[51] Int. Cl. ...................................................... G06g 7/18,
  G05b 11/42
[50] Field of Search .......................................... 235/183,
  151, 151.1; 318/18

[56] References Cited
UNITED STATES PATENTS
2,946,943 7/1960 Nye et al. ...................... 235/183X
3,377,547 4/1968 Ohlson .......................... 318/18
OTHER REFERENCES
Russel et al.; The Analog Computer as a Process Controller, Control Engineering, Sept. 1957, pages 160— 165

Primary Examiner—Eugene G. Botz
Assistant Examiner—Felix D. Gruber
Attorney—Barlow and Barlow ABSTRACT: A controller which is adapted to accept two input signals and produce a third signal which is applied as the analog of the rate of change of a fourth variable affecting one of the input signals.

INVENTORS
RICHARD S. SLAWSON
THEODORE C. HAMLIN
BY
Barlow + Barlow
ATTORNEYS

CONTROLLER

CROSS REFERENCE TO RELATED APPLICATION

This application is a continuation in part of our copending application Ser. No. 726,987, filed May 6, 1968 now abandoned.

BACKGROUND OF THE INVENTION

In the past analog controllers have been designed to effectively subtract the process transmitter signal from the set-point signal and to modify this difference signal or error signal by the subtraction therefrom of a feedback signal which, in turn, is the final output signal modified in a variety of fashions by a feedback network having a capacitive, nonconductive series element, and finally to apply high gain to this latter difference in order to obtain the output signal. This type of controller has certain difficulties for, if there is a prolonged error that the controller is sensing for a long period of time due to the fact that the variable which is being controlled has not reached its set point, the said feedback signal will decay to zero because of the capacitive series element, and the controller will wind up, since the high-gain amplifier is now only responsive to the difference between the set-point and the transmitter signal. The typical mathematical equation which represents the prior art method of operating continuous analog controllers is given by the formula:

$$m = M_0 + P\left[(r-x) + K_3\frac{d}{dt}(r-x) + K_1\int_0^t(r-x)dt\right]$$

where:

$m$ = controller output or its transform (percent of Full Scale)
$M_o$ = controller output at $t=o$ (percent of Full Scale)
$P$ = proportional gain
$r$ = set point or its transform (percent of Full Scale) $x$ = transmitter signal or its transform (percent of Full Scale)
$K_3$ = derivative time or rate time (seconds)
$K_1$ = any constant reset rate or integral rate (seconds [11])
$t$ = time (seconds) Classically the first term within the brackets is known as proportional, the second term as rate or derivative, and the third term as integral or reset. This sequence will be preserved through the remainder of this specification. If the expression above is differentiated with respect to time, the following equation results:

$$\frac{dm}{dt} = P\left[\frac{d}{dt}(r-x) + K_3\frac{d^2}{dt^2}(r-x) + K_1(r-x)\right]$$

This equation disregards the term $M_0$. Now if $m$ is the value of the output of a process controller, we find that it is the output velocity or output rate of change which is related to instantaneous error, $r-x$, and to the first and second derivatives of the error with respect to time. This equation therefore suggests that reset windup can be avoided by replacing the integrating circuit of the first equation with a second differentiator circuit, which we will call a second augmenting differentiator circuit, and using a velocity algorithm.

In applications where it is desirable to operate the controller with the proportional response, the above equations do not suggest a means of eliminating only the proportional term by adjusting a coefficient to zero. Although either or both the derivative term and/or the reset term could be eliminated by adjusting coefficients, leaving only the proportional term in the above equations, proportional response by itself or with derivative response is incapable of returning the process variable to its set point after a change in loading has occurred.

The above equations produce derivative response to set-point changes. Although this can occasionally be helpful, controller performance is much more predictable if this response is eliminated, since rates of change for set-point adjustments can be entirely arbitrary.

Difficulty is sometimes encountered in transferring between manual and automatic control with controllers using the above equations, since a disparity between the transmitter signal and the set point will obviously produce a sudden change or "bump" in the final output signal from the controller when transferring from manual to automatic control. Similarly, a disparity between the automatic and manual output signals will produce a bump when transferring from automatic to manual control.

In the remainder of the specification the following symbol definitions will be used:
$a$ = derivative response gain or rate response gain
$b$ = proportional response gain
$c$ = process variable or its transform (percent of Full Scale)
$e_1$ = modified error or its transform (percent F.S.)
$e_2$ = remodified error or its transform (percent F.S.)
$\epsilon$ = base of natural logarithms
$s$ = complex-frequency variable
$H$ = function of $K_3$ and the time constants of first-order lags between $c$ and $x$
$K_2$ = proportional time (seconds)
$R$ = any constant set point (percent F.S.)
$X_o$ = transmitter signal at $t=0$ (percent F.S.)
$x_1$ = modified transmitter signal or its transform (percent F.S.)

SUMMARY OF THE INVENTION

This invention relates to an analog controller which is in effect a reset or integral mode controller to which proportional and derivative responses can be added to the extent required. By arranging the circuitry so that in effect we have two separate functions, one for set point and one for the transmitter signal, a controller output can be derived that exhibits no derivative response to set-point changes. An electronic circuit is therefore designed to effectively implement an equation somewhat similar to the last equation mentioned above in the Background of the Invention paragraph, which permits bumpless transfer in both directions between automatic and manual control without prior balancing of signals. No matter what element is responsible for the final integration of the computed velocity, $K_1e_2$, whether it be a valve stem or a storage capacitor, the final output, $m$, is confined between a maximum and a minimum value, thereby effectively preventing implementation of the computed velocity, $K_1e_2$, when such implementation would call for excursions beyond these limits. Therefore, the integrating element responds immediately to a computed velocity having a sign (plus or minus) that calls for the output, $m$, to vary in a direction away from one of these limits toward the opposite limit. The controller, therefore, of this invention eliminates the possibility of what we termed wind-up, thereby permitting the selection of reset rates that are fully adequate to the control problem at hand.

DESCRIPTION OF THE PREFERRED EMBODIMENT

In proceeding with this invention, certain basic propositions must be assumed from the start. The analog controller of this invention, therefore, embodies two separate transfer functions, one for set point and one for transmitter signal, which are added together to provide the proper controller output and in order to eliminate derivative response to set-point changes, which has been noted above to be undesirable Outputs based on the following functions are therefore desired: For the set point.

$$\left(\frac{dm}{dt}\right)_{\text{Setpoint}} = K_1\left(K_2\frac{dr}{dt} + r\right)$$

For the transmitter:

$$\left(\frac{dm}{dt}\right)_{\text{Transmitter}} = -K_1\left[(K_2+K_3)\frac{dx}{dt} + K_2K_3\frac{d^2x}{dt^2} + x\right]$$

$$\frac{dm}{dt} = \left(\frac{dm}{dt}\right)_{\text{Setpoint}} + \left(\frac{dm}{dt}\right)_{\text{Transmitter}}$$

or expressed in another way $$\frac{dm}{dt} = K_1\left[K_2\frac{dr}{dt} - (K_2+K_3)\frac{dx}{dt} - K_2K_3\frac{d^2x}{dt^2} + (r-x)\right]$$

where $K_2$ is proportional time in seconds.

If the process variable, $c$, is followed by a series of first-order lags 24, such as represented by the transfer function $G_2(s)$, from which the resultant output signal is the transmitter signal, $x$, and if the sum $r-x-K_3dx/dt$ is held equal to zero, and if the set point, $r$, is a constant, then it can be shown mathematically that, regardless of the lags 22, such as represented by the transfer function $G_1(s)$, between the controller output and the process variable $c$, the process variable $c$ will approach this set point, (i.e. $c=r$), along an exponential curve according to the relationship $c=HR+(I-H)[R-(R-X_o)\epsilon^{-t/K_3}]$ where $H$ is a function of $K_3$ and the time constants of the first-order lags 24 between $c$ and $x$, and where $c=R$ is the asymptote. Mathematically it can be shown that if $K_3$ is greater than the largest time constant of the first-order lags between $c$ and $x$, $c$ will not cross the asymptote under the above conditions. Likewise it can be shown that if $K_3$ is less than the largest of these time constants, $c$ will cross the asymptote once before making its exponential approach from the opposite side of the asymptote. Therefore, if we say that $r-x-K_3dx/dt$ is $e_1$, the objective in this device is to control $e_1$ at a set point of zero effectively as if it were the process variable to be controlled, while establishing $K_3$ at a suitable compromise value between excessive process overshoot and excessive sluggishness in control response.

Figures 1, 1A, 2:
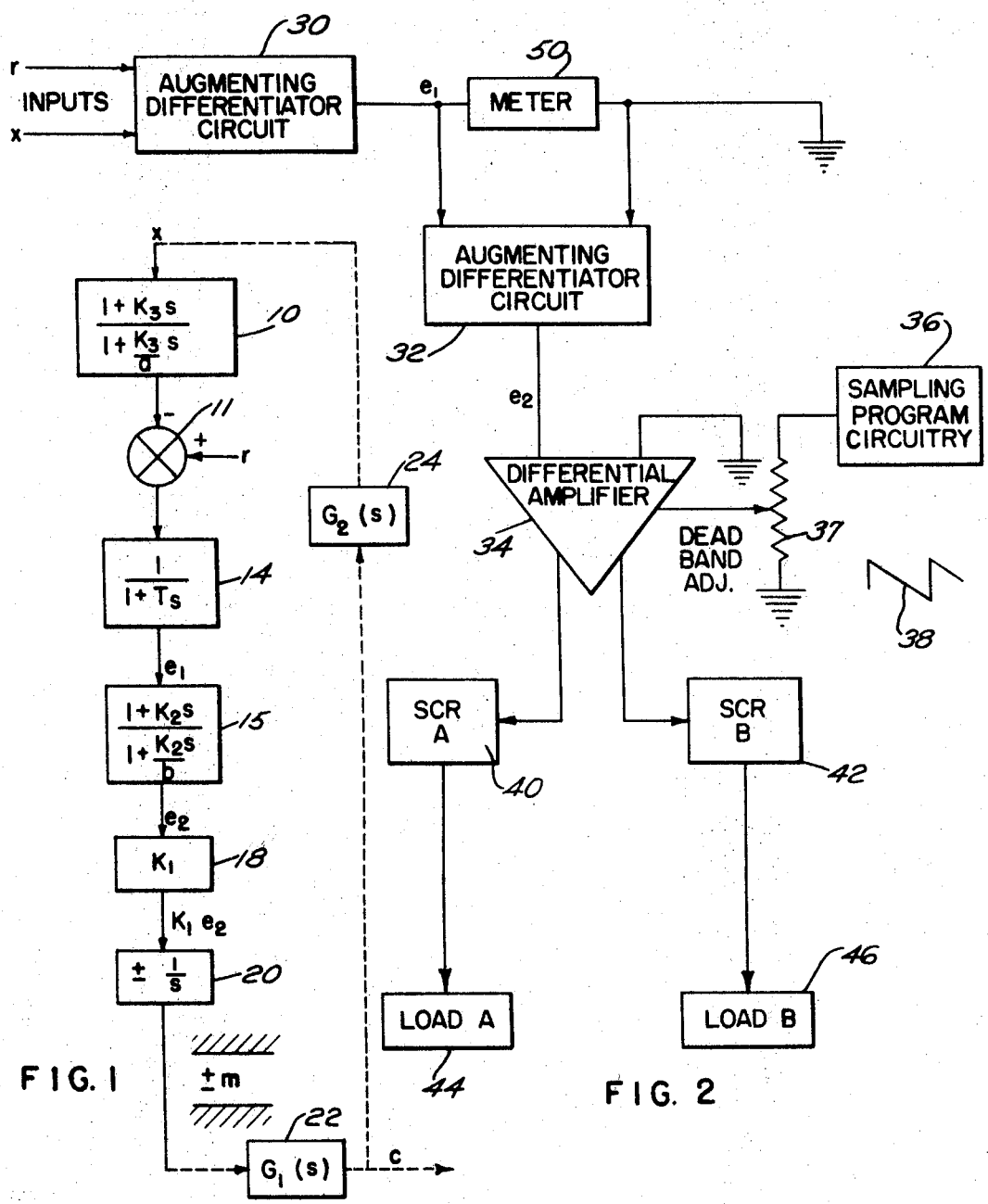
FIG. 1 is a mathematical block diagram in the complex-frequency variable, $s$, based on the derivation of the controller of this invention.
FIG. 1A is a set of mathematical conditions which must be assumed to make FIG. 1 operate.
FIG. 2 is a block diagram of an implemented form of the invention.

Turning to FIG. 1 of the drawing, the first part of this relationship is a modification of the input signal $x$ where it is modified in block 10 by a first-order filter having the transfer function $1/1+K_3s/a$ and where $x$ is also modified by the transfer function $1+K_3s$. The modified signal then is subtracted from the signal $r$ or set-point signal in function circle 11, and the difference is fed to a first-order filter 14 having the transfer function $1/(1+Ts)$. The manner in which the objective of controlling $e_1$ at a set point of zero is essayed, is by the next modifying blocks 15, 18 and 20 which represent an inner controller having proportional and integral responses and a fixed set point of zero. As is well known in the art, a process variable such as the signal $e_1$, which has been produced from equivalent capacitance and/or inductance networks, can be controlled by means of proportional and integral control modes operating simultaneously in such a manner as ultimately to bring the error, in this case ($0-e_1$), to a value of zero. Thus the algorithm of the said inner controller used in this embodiment is $$\frac{dm}{dt} = K_1\left(K_2\frac{de_1}{dt} + e_1\right)$$

where under the prior art $K_1K_2$ would be termed proportional gain and $1/K_2$ would be termed reset rate or integral rate since the above equation can be arranged into the form $$\frac{dm}{dt} = K_1K_2\left(\frac{de_1}{dt} + \frac{1}{K_2}e_1\right)$$

Thus if in block 15 the signal $e_1$ is modified by the transfer function $1+K_2s$ and is filtered by the transfer function $1/1+K_2s/b$, it will be seen that the proportional response can be eliminated if desired by adjusting $K_2$ to zero. It will be seen that the modifying functions here completely ignore the value of the output, $m$, and merely sense the need for correction from the input signals, $r$ and $x$. The limitations on the filters that are contained by the blocks 10, 14 and 15 have been expressed in mathematical terms since it is necessary that the time constants of the filters be such that they do not interfere excessively with the lead functions, $1+K_3$ and $1+K_2$, and further that the various functions represented by these filters are attained in the relationship that is illustrated in FIG. 1A.

It is now obvious that we have a signal $e_2$ which in effect can be considered the analog of output rate of change, $dm/dt$. It is necessary, however, to modify this signal by a transfer function which is represented by the block 18 and labeled $K_1$. This function in effect adjusts the gain of the control loop and is identifiable as reset rate or it may be called integral rate, and it differs from the classic representation of analog control where this constant would be replaced by proportional gain, $P$. Thus the signal $e_2$ is multiplied by this reset rate, $K_1$. The output of the block 18 is a value which we have termed the computed velocity, and the final block 20 represents the integration of the computed velocity, which can be accomplished electromechanically by a motor or electrically by a capacitor. When the block diagram of FIG. 1 is implemented, transfer between automatic and manual control can be accomplished in a bumpless fashion because the instantaneous state of the integrating element is not changed by accomplishing the transfer.

Referring to FIG. 2, a possible method of implementing the block diagram of FIG. 1 has been shown. In this case the two inputs $x$ and $r$ are shown as being fed to an augmenting differentiator designated 30. This augmenting differentiator will basically consist of an adder circuit, a differentiator, and a low-pass active filter. This in effect combines the blocks 10, 11 and 14 of FIG. 1. The output, $e_1$, is then fed to a second augmenting differentiator 32 which consists of an adder circuit, a differentiator, and a low-pass filter. This effectively implements the block 15 of FIG. 1 and effectively produces the signal $e_2$. This output is then fed to a differential amplifier 34 which has an adjustable common-mode output bias, which adjustability can be exploited through the use of sampling program circuitry designated by the block 36 which operates across a dead-band adjustment resistance 37 to vary the common-mode output bias cyclically. The output of the sampling program circuitry is a wave form such as is shown at 38, which is really a sawtooth wave, and in this way in effect what is happening is that the average output velocity is being controlled by a variable ramp-step displacement of the output, $m$. The output of the differential amplifier is being shown as controlling a pair of silicon-controlled rectifiers 40 and 42 that in turn can control two loads 44 and 46 that may take a variety of forms, such as the two phases of a reversible synchronous motor or the gates of enhancing and depleting channels that change the value of a final output, $m$, at a constant rate (i.e., $\left|\frac{dm}{dt}\right|$ is constant) while in the "on" state, so long as no constraint is operative upon said output. The "loads" in labeled blocks 44, 46 should include some form of integration, electromechanical as in a motor or electrical as in a capacitor.

It will be appreciated that the appropriate silicon-controlled rectifier will be turned "on" at the beginning of the sawtooth wave (i.e., the vertical section) even if the absolute magnitude of input, $|e_2|$, to the differential amplifier 34 is only slightly larger than that permitted by the dead-band adjustment; and that, when $|e_2|$ falls below the value which would at that instant be required in order to turn "on" the silicon-controlled rectifier, an anode turnoff will occur at the end of the existing line half-cycle for an AC load. Similarly, means can be provided for securing prompt turnoff under the above conditions if other switch means are substituted for the silicon-controlled rectifiers and if DC loads are substituted for AC loads.

It will also be appreciated that if the sampling program circuitry is adjusted to a particular frequency, this will be the frequency at which the differential amplifier 34 requires a particular absolute magnitude of input, $|e_2|$, in order to maintain the appropriate silicon-controlled rectifier in the "on" state for a particular portion of the sawtooth cycle Thus this frequency adjustment is one means by which the reset rate, $K_1$, can be adjusted. Another means is by adjusting the angle of the downwardly sloping portion of the waveform 38. The use of such a sampling program circuitry also accommodates to some degree transportation lags.

Now if the reset rate, which has previously been expressed as a constant, is more broadly defined as the first derivative of computed velocity with respect to $e_2$, inspection of the waveform 38 discloses that modification of either the vertical or the sloping section thereof from the rectilinear shape will transform the computed velocity into a nonlinear function of $e_2$, and the reset rate therefore will become a function of $e_2$. Such a relationship can be useful in certain applications such as those in which it is desirable, for instance, to have the reset rate decrease as $e_2$ approaches zero.

It will be noted that a deviation meter 50 has been placed in the circuit right after the first augmenting differentiator 30, since at this point the transmitter lag has been at least partially offset by inclusion of a lead term, $K_3 dx/dt$. Thus the operator will be provided with more accurate readings of the true instantaneous process value, $c$.

Figure 3:
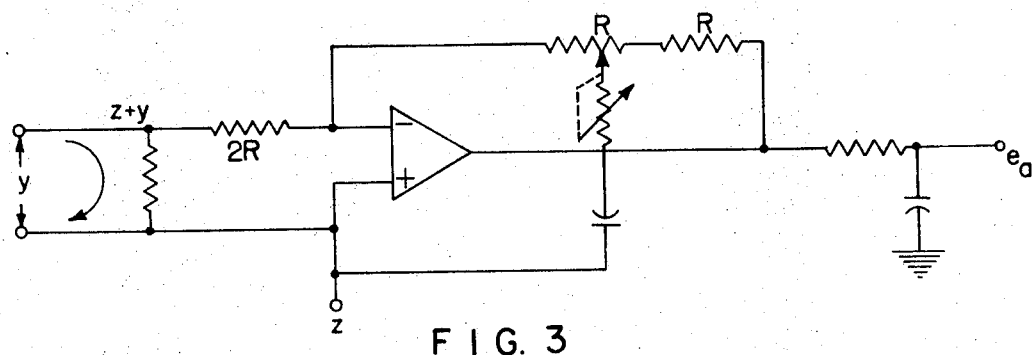
FIG. 3 is a schematic diagram of the blocks labeled augmenting differentiator circuit.

In FIG. 3 we have shown a suitable augmenting differentiator circuit that will operate to implement the functions disclosed in FIG. 1. This circuit effectively includes elements as represented by the blocks 10, 11 and 14. To explain its operation, we shall assume there are input signals $y$ and $z$ applied to the terminals thereof, and we shall let $e_a$ equal the output. Mathematically, then, the following relationship is attained:

$$e_a = \left(\frac{1}{1+T_s}\right)\left[z - y\left(\frac{1+K_3 s}{1+\frac{K_3}{a}s}\right)\right]$$

To substitute for the augmenting differentiator circuit of block 30, we must let $z$ equal the input signal $r$ and $y$ equal the input signal $x$, then:

$$e_a = \left(\frac{1}{1+T_s}\right)\left[r - x\left(\frac{1+K_3 s}{1+\frac{K_3}{a}s}\right)\right] = e_1$$

To substitute this for the augmenting differentiator circuit of block 32, we must have the input at $z$ equal to zero, the signal $e_1$ being applied at $y$; $T$ equal to zero; $a$ equal to $b$ and $k_3$ equal to $K_2$, then the following relationship will be attained:

$$e_a = -e_1\left(\frac{1+K_2 s}{1+\frac{K_2}{b}s}\right) = -e_2$$

It will be noticed that the output $e_2$ is inverted but the sign of the signal is inconsequential since it is being fed to a differential amplifier 34 and it can be easily reinverted by connecting it to an alternate amplifier input.

Figure 4:
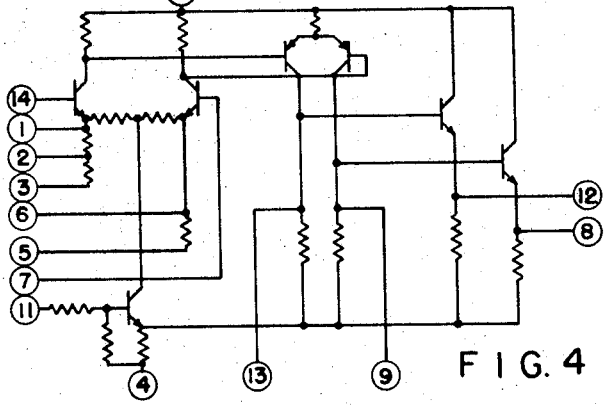
FIG. 4 is a schematic diagram of a suitable differential amplifier.

The differential amplifier diagrammed at 34 in FIG. 2 is known device which is offerred to the trade, as for example, by Texas Instruments, as a general-purpose differential amplifier, type SN523A. This unit is shown diagrammatically in FIG. 4 and would be connected as follows: The terminal 14 which is considered to be input 1 would be connected to the output of our augmenting differentiator circuit 32 shown in FIG. 2. Terminal 7 which is the second input would be connected to ground. Terminal 10 would be connected to the positive voltage supply and terminal 4 would be connected to the negative supply. Terminal 11 may then be connected to the movable contact of potentiometer 37 and terminals 8 and 12 would be connected to the gates of the SCR's 40 and 42 or they could alternately be connected to the gates of the enhancing and depleting channels mentioned above, Terminals 1, 2, 3, 5, 6, 9 and 13 would be left unconnected as they provide functions that are not necessary. The common mode voltage at output terminals 8 and 12 will vary with the voltage applied at terminal 11. The differential voltage measured between terminals 8 and 12 will vary with the voltage applied at terminal 14.

Figure 5:
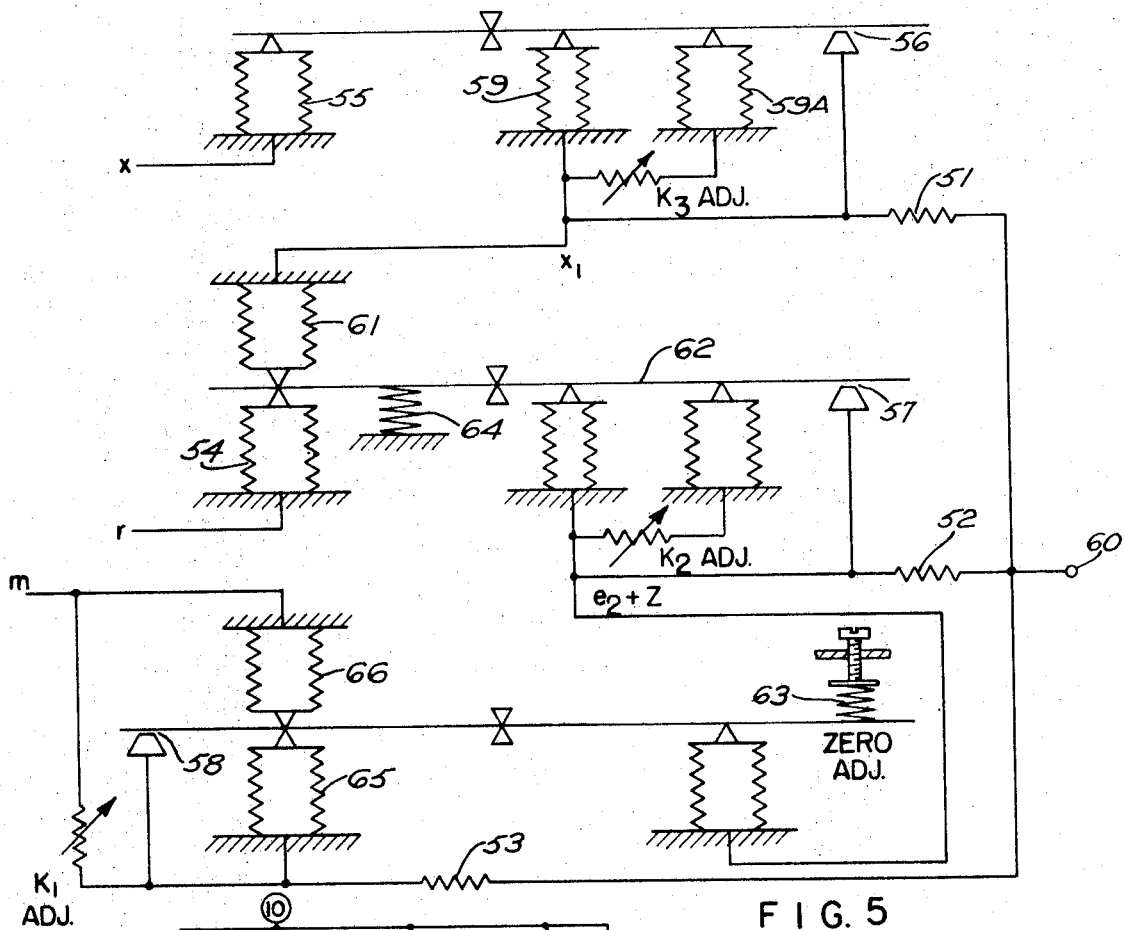
FIG. 5 is a diagram of a pneumatic implemented form of the invention.

Referring now to FIG. 5, there is shown one of several possible pneumatic implementations of the device of FIG. 1 in which an air supply is connected to terminal 60 and feeds through suitable pressure reducing devices 51, 52 and 53, the operational portion of the device. Signal inputs $r$ and $x$ are shown as being connected to operational bellows 54, 55 respectively and the operational amplifiers shown in the electronic embodiment are effectively replaced by the familiar nozzle and flapper arrangements which are indicated at 56, 57, 58. The value of the output signal of the upper circuit which is labeled $x_1$ may be effectively represented by the following expression:

$$x_1 = \frac{x(1+K_3 s)}{\left(1+\frac{K_3}{a}s\right)}$$

The signal $x_1$ is generated by means of the nozzle-flapper arrangement 56, which operates to compel an equality between the input signal $x$ on the one hand and a fraction of the output signal applied by means of bellows 59 augmented by the complementary fraction of the filtered version of the output signal on the other hand applied by means of bellows 59A. This technique is well known to those versed in the art. This output is then fed to the bellows 61 which in combination with the bellows 54 receiving the input signal $r$ gives us the adder function as an output to the pivoting beam 62. The output of this stage is labeled $e_2+Z$ in which $z$ is equal to a fixed zero bias that must be introduced, as by spring 64, in this second amplifier as positive pressure must be used throughout. $e_2$ can be effectively represented by the following expression:

$$e_2 = (r - x_1)\left(\frac{1+K_2 s}{1+\frac{K_2}{b}s}\right)$$

The signal $(e_2 + Z)$ is similarly generated by means of the nozzle-flapper arrangement 57, except that in this instance the input signal consists of an effective spring force augmented by the signal $r$ and diminished by the signal $x_1$. The fixed zero bias $Z$ introduced by the spring 64 in the second amplifier may be effectively cancelled out by adjustment of the spring 63 in the third amplifier. The output $m$ is generated by means of the nozzle-flapper arrangement 58, which operates to compel an equality between the signal $(e_2 + Z)$ diminished by the adjustable spring force, as at 63, on the one hand and an intermediate signal, which is the nozzle pressure applied by means of bellows 65 diminished by a filtered version of the intermediate signal on the other hand applied by means of bellows 66, the said filtered version of the intermediate signal being taken as the output $m$. The reset rate $K_1$ is effectively realized mathematically as the reciprocal of the time constant of the circuit which generates the output $m$ from the signal $(e_2 ++ Z)$. It can now be readily appreciated that our output $m$ is effectively equal to $$e_2\left(\frac{K_1}{s}\right)$$

The foregoing illustrates that $k_1$ can be realized either through the time constant of an integrating circuit or alternately through any other means that operates to determine the proportionality existing between the remodified error signal $e_2$ and the consequent rate of change or time-averaged rate of change of the controller output.

In the above pneumatic embodiment, the filter function of block 14 of FIG. 1 is not usually required, since the input signals $r$ and $x$ do not pick up noise in their transmission lines but instead tend to be purged of high frequencies through the well-known filter action of the transmission lines themselves. It can therefore be seen that in this pneumatic embodiment all

We claim:

1. A controller adapted to accept two input signals, $r$ and $x$, and produce an output $m$, comprising first means modifying the signal $x$ to produce a first signal which can be expressed by the function $$x + K_3 dx/dt$$

where $K_3$ = time constant of said means second means responsive to the signal $r$ and subtracting the first signal from the signal $r$ to generate a second signal which can be expressed by $r-x-K_3 dx/dt$, third means modifying the second signal to produce a third signal which can be expressed by the function $$K_2 \frac{dr}{dt} - (K_2+K_3)\frac{dx}{dt} - K_2 K_3 \frac{d^2x}{dt^2} + (r-x)$$

where $K_2$ = time constant of said third means said function representing the analog of the rate of change of the controller output, fourth means for multiplying the third signal by a factor $K_1$ and including an integrating element for time integrating the product thereof to produce an output $m$.

2. A controller as in claim 1 wherein means for realizing the factor $K_1$ includes a periodic waveform source.

3. A controller as in claim 1 utilizing external means expressed by the transfer function $G_1(s)G_2(s)$ for coupling the output $m$ to signal $x$ whereby the signal $x$ is affected in a manner to ultimately bring the signal $x$ into agreement with the signal $r$, said external means including a coupling between the process variable $c$ and the output $m$ defined by the transfer function $G_1(s)$ whereby the process variable $c$ is brought into effective agreement with the signal $r$.

4. A controller as in claim 2 wherein the output waveform of said periodic waveform source is adjustable as to both frequency and shape whereby not only is the value of $K_1$ adjusted, but also the reset rate is transformed into a function of the third signal.

UNITED STATES PATENT OFFICE
CERTIFICATE OF CORRECTION

Patent No. 3,584,208                        Dated June 8, 1971

Inventor(s) Richard S. Slawson and Theodore C. Hamlin

It is certified that error appears in the above-identified patent and that said Letters Patent are hereby corrected as shown below:

Column 1, line 38, delete "x ="; column 1, line 39, insert at the beginning of the line --x = --; column 1, line 41, "(seconds $^{11}$)" should read --(seconds -1)--; column 1, line 42, "Classically" should begin a new line; column 1, line 63, "with" should read --without--. Column 3, line 22, "$G_2(s,$" should read --$G_2(s)$,--; column 3, line 28, "(i.e. c=r)" should read --(i.e. c=R)--; column 3, line 30, the formula should read $$c = HR + (1-H)\left[R - (R - X_0)\epsilon^{-t/K_3}\right]$$

column 3, line 48, the formula should appear as follows -- $\dfrac{1}{1 + K_3 s/a}$ --; column 3, lines 73 and 74, the second formula should read -- $\dfrac{1}{1 + K_2 s/b}$ --. In column 4, line 6, the formulas should read -- $1 + K_3 s$ -- and -- $1 + K_2 s$ --. Column 5, line 46, "$k_3$" should read --$K_3$--; column 5, at the end of line 57, insert --a--; column 5, line 72, "above," should read --above.--. Column 6, line 25, "the filtered" should read --a filtered--; column 6, line 31, "z" should read --Z--; column 6, line 46, "mis" should read -- m is --; column 6, line 56, the formula should read --$(e_2 + Z)$--; column 6, line 64, "$k_1$" should read --$K_1$--. Column 7, line 9, the formula should read --$x + K_3 dx/dt$--; column 7, line 10, the following should be read with the formula --where $K_3$ = time constant of said means--; column 7, line 19, the following should be read with the formula --where $K_2$ = time constant of said third means--. In Column 8, line 12, "mdefined" should read --m defined--.

Signed and sealed this 5th day of September 1972.

(SEAL)
Attest:

EDWARD M. FLETCHER, JR.                     ROBERT GOTTSCHALK
Attesting Officer                             Commissioner of Patents